(12) United States Patent
Jutte et al.

(10) Patent No.: US 7,009,928 B2
(45) Date of Patent: Mar. 7, 2006

(54) OPTICAL SCANNING DEVICE WITH TWO-WAVELENGTH LASER FOR HD AND LD SCANNING

(75) Inventors: Petrus Theodorus Jutte, Eindhoven (NL); Jacobus Maria Antonius Van Den Eerenbeemd, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 900 days.

(21) Appl. No.: 09/961,955

(22) Filed: Sep. 24, 2001

(65) Prior Publication Data

US 2002/0051247 A1    May 2, 2002

(30) Foreign Application Priority Data

Sep. 25, 2000   (EP)   .................................. 00203326

(51) Int. Cl.
     *G11B 7/135*      (2006.01)
(52) U.S. Cl. ............................ 369/112.05; 369/112.08; 369/112.09
(58) Field of Classification Search ................ 369/121, 369/122, 112.04, 112.08, 112.07, 112.09, 369/112.05
See application file for complete search history.

(56) References Cited

U.S. PATENT DOCUMENTS

| 5,467,335 | A | | 11/1995 | Braat .......................... 369/100 |
| 5,615,200 | A | * | 3/1997 | Hoshino et al. ....... 369/112.04 |
| 5,717,674 | A | * | 2/1998 | Mori et al. ............... 369/112.1 |
| 5,986,998 | A | * | 11/1999 | Park ........................... 369/121 |
| 6,643,245 | B1 | * | 11/2003 | Yamamoto et al. ..... 369/112.01 |
| 6,791,932 | B1 | * | 9/2004 | Maruyama ............. 369/112.05 |

FOREIGN PATENT DOCUMENTS

JP            11185282  A       7/1999

OTHER PUBLICATIONS

Electronic translation of JP 11-185282.*

* cited by examiner

*Primary Examiner*—William Korzuch
*Assistant Examiner*—Van T. Pham
(74) *Attorney, Agent, or Firm*—Michael E. Belk

(57) ABSTRACT

In an optical scanning device for scanning both a high-density, HD, record carrier (38) and a low-density, LD, record carrier (18), a two-wavelength diode laser (50) is used for generating the HD scanning beam and the LD scanning beam. By arranging a composite diffraction element (60) close to the diode laser (50), which element has a first diffraction structure (63), for combining the HD beam and the LD beam, and a second diffraction structure (64), which acts as a lens for either the LD beam or the HD beam only, a compact device is obtained, which is suitable for writing the LD information layer (40).

12 Claims, 7 Drawing Sheets

OPTICAL SCANNING DEVICE WITH TWO-WAVELENGTH LASER FOR HD AND LD SCANNING

The invention relates to an optical scanning device for scanning, in a first mode of operation, a first type of record carrier having a first information layer and a first transparent layer of a first thickness and for scanning, in a second mode of operation, a second type of record carrier having a second information layer and a second transparent layer of a second thickness, different from the first thickness, which device comprises a two-wavelength diode laser for generating a first, HD, radiation beam in the first mode and a second, LD, radiation beam in the second mode, an objective system designed for operation at a first set of conjugates to focus the HD beam on the first information layer in the first mode and for operation at a second, different, set of conjugates to focus the LD beam on the second information layer in the second mode, and a first diffraction element arranged in the radiation path between the two-wavelength diode laser and the objective system.

Such an optical scanning device is known from the English-language abstract of JP-A 11-185282. The HD beam and the LD beam are herein understood to mean the beams used for scanning an information layer with a higher information density and an information layer with a lower information density, respectively.

Generally, the transparent layer in optical record carriers is intended to protect the information layer from ambient influences, keeping dust particles, scratches etc. at a sufficient distance from the information layer, and to provide mechanical support to the information layer. In other words, the transparent layer functions as a substrate for the information layer. The thickness of the transparent layer is a compromise between the thickness which is desired to give the record carrier the desired rigidity and the thickness which is desired in connection with the numerical aperture (NA) of the scanning beam incident on the transparent layer.

The NA of the objective system on the side of the record carrier is determined by the resolution the scanning device must have to read or write an information layer with a given density. The resolution of the scanning device, which resolution is inversely proportional to the minimum scanning spot size that can be formed by the device, is proportional to NA/$\lambda$, wherein $\lambda$ is the wavelength of the scanning beam. For scanning a record carrier with a larger information density, like the DVD (digital versatile disc), a scanning beam, hereinafter referred to as HD (high-density) scanning beam, should be used which has a higher NA and a smaller $\lambda$ than the scanning beam, hereinafter referred to as LD (low-density) scanning beam used for scanning a record carrier with a lower information density, like the CD (compact disc). For record carriers with a larger information density, thus requiring a higher NA, it is often necessary to reduce the thickness of the information layer so as to decrease the influence of tilt of the record carrier with respect to the optical axis of the scanning device on the quality of the focus, or scanning spot. With the advent of novel record carriers having larger information densities, different types of record carriers having different thicknesses of the transparent layer will be coming on the market. A compatible scanning device will have to be able to scan the different types of record carriers, independently of the thickness of the transparent layer. The objective system of a compatible scanning device for two types of record carriers should have a first set of conjugates for scanning the first type of record carrier and a second, different, set of conjugates for scanning the second type of record carrier. The two conjugates of an objective system are herein understood to mean the distance between the object plane, i.e. the emitting surface of the radiation source, and the first principal plane of the objective system, and the distance between the second principle plane of the objective system and the image plane, i.e. the plane of the information layer, respectively. Scanning a record carrier is herein understood to mean moving a scanning spot, formed by a scanning beam, and the information layer relative to each other for the purpose of reading, writing and/or erasing information.

In order to obtain two scanning beams having different NAs with one objective system in a compatible scanning device, a so-called dichroic annular means, for example, a filter may be arranged in the radiation path before the objective system or on the first surface of this objective system. Such a dichroic filter transmits the HD scanning beam and blocks or deflects the rim of the LD scanning beam, so that only the central part of the latter beam is transmitted by the objective system to the LD information layer. The LD scanning beam forms a scanning spot on the LD information layer, which spot is broader than the scanning spot formed by the HD scanning beam on the HD information layer. Especially for a compatible scanning device, wherein the LD scanning beam is not only used for reading but also for recording an information layer, and wherein a maximal quantity of radiation from the radiation source should reach the information layer, a better alternative is to arrange an additional lens in the radiation path before the objective system. Such a lens, which may be called a pre-collimator lens, changes the vergence of the beam from the source such that the LD beam fills only the central part of the objective system and the NA of the LD beam is such that, after passage through the objective system, the beam has the required image side NA. The pre-collimator lens should be arranged in the path of the LD scanning beam only.

The HD and LD scanning beams with different wavelengths may be generated by two separate radiation sources, for example laser diodes, emitting different wavelengths. These scanning beams may be combined, i.e. made co-axial, before entering the objective system by a dichroic beam-splitting element, for example a prism or a semi-transparent mirror, which transmits a portion of one of the beams and reflects a portion of the other beam in the same direction.

In order to reduce the size and weight of a compatible scanning device, a so-called two-wavelength laser module in combination with a beam-combining element can be used, as shown, for example, in the English-language abstract of JP-A 11-85282. The two-wavelength module is a single laser chip comprising two light-emitting elements, which emit different wavelengths. The beam-combining element is a diffraction grating, arranged close to the laser chip, which diffracts only one of the beams so that the chief rays of these beams, or the beam axes, become co-axial. In this scanning device it is not possible to arrange a pre-collimator lens in the path of the LD beam only.

It is an object of the invention to provide an optical scanning device as described in the opening paragraph, which device is provided with a lens means in the LD beam only. This scanning device is characterized in that a second diffraction element is arranged in the radiation path between the two-wavelength diode laser and the objective system, which element has a lens function for either the LD beam or the HD beam only.

It is well known that a lens with two refractive surfaces can be replaced by a planar diffraction element, which diffracts the rays of a beam in such a way that the vergence of the beam is changed in the same way as by the refractive lens. Such a diffraction element may have the form of a diffraction grating having curved grating strips which alternate with intermediate strips. The grating strips may be formed by grooves in the surface of the element. The invention is based on the recognition that the parameters of such a diffraction element, for example the depth of the grooves, may be chosen to be such that the element acts as a lens only for a radiation beam having a given wavelength. For a radiation beam having a different wavelength, the element is just a transparent plate. Arranging a diffraction element, which is designed to diffract the LD beam only, in the radiation path of the beams from the two-wavelength diode laser, has the effect that the LD beam meets a lens and the HD beam does not, although the diffraction element is arranged in the path of both beams. This diffraction element changes the vergence of the LD beam so that, in the plane of the pupil of the objective system, this beam has a cross-section which is smaller than that of the HD beam and covers only the central part of this pupil. It is also possible to arrange a diffraction element that diffracts the HD beam only in the radiation path of the beams from the two-wavelength laser. This diffraction element should enlarge the cross-section of the HD beam in such a way that this beam fills the whole pupil of the objective system, while the vergence of the LD beam is not changed and is such that this beam fills only the central part of the pupil.

The optical scanning device is preferably further characterized in that the first and second diffraction elements are constituted by a first and a second diffraction structure arranged at an entrance surface and an exit surface, respectively, of a transparent body.

By integrating the two diffraction elements in one element, the number of elements is reduced so that the scanning device becomes simpler and its manufacturing costs are reduced. The composed diffraction element can be manufactured by means of well-known pressing or replication techniques. By simultaneously using a first mould having an inner surface profile which corresponds to the first diffraction structure and a second mould having an inner surface profile which corresponds to the second diffraction structure, the composite diffraction element can be manufactured in one step.

The scanning device may be further characterized in that at least one of the first and second diffraction elements has a positive lens function.

The diffraction element with the positive lens function may convert a portion of the divergent LD source beam into a convergent LD beam, and the other diffraction element then provides a further adaptation of this beam so that it fills the central part of the pupil of the objective system.

Alternatively, the scanning device may be characterized in that at least one of the first and second diffraction elements has a negative lens function.

The diffraction element with the negative lens function may convert at least a portion of the HD source beam into a more divergent beam, and the other diffraction element then provides a further adaptation of this beam so that it fills the pupil of the objective system.

The diffraction structures of the composite diffraction element may also have such a design that they provide two positive lens functions or two negative lens functions, instead of one positive lens function and one negative lens function as mentioned herein above. The design of the scanning device as such determines which diffraction structure should provide a lens function and what the lens function should be, positive or negative.

In embodiments of the scanning device, wherein the second diffraction element has only a lens function to change the vergence of one of the beams, the diffraction structure of this element is relatively simple. As the second diffraction element then converts an asymmetrical portion of the corresponding one of the source beams to form the beam with the required vergence, the latter beam may show some asymmetry in intensity, which is acceptable under certain circumstances.

Said latter beam has a symmetrical intensity distribution in a scanning device which is characterized in that the second diffraction element is designed so as to select, for the beam whose vergence is adapted, a symmetrical portion of the corresponding beam from the two-wavelength laser.

As the second diffraction element should not only have a lens function but also be able to deflect the chief ray of the LD beam, its diffraction structure is somewhat more complicated.

The scanning device is preferably further characterized in that the first and second diffraction elements are arranged close to the two-wavelength diode laser.

The diffraction elements can then be small, because they are arranged at a position where the LD and HD beams still have a small cross-section.

This embodiment of the scanning device is preferably further characterized in that the distance between the diode laser and the diffraction element facing the laser is between 1 mm and 4 mm.

For such a distance, the pitches of the diffraction structures are such that these structures can be easily manufactured.

For the same reason, this embodiment is preferably further characterized in that the distance between the first and second diffraction elements is between 2 mm and 8 mm.

For such a distance, the pitches of the diffraction structures are large enough for easy manufacture of these structures.

The scanning device may be further characterized in that a beam shaper is arranged in front of the two-wavelength diode laser, which beam shaper has a beam vergence changing entrance face and a refractive exit face.

With such a beam shaper, the diode laser beam having an elliptical cross-section can be converted into a beam having a circular cross-section, without loss of radiation. An effective and small beam shaper, in the form of a lens, which can be arranged close to a diode laser, is disclosed in U.S. Pat. No. 5,467,335. By providing a beam shaper in the compatible scanning device, the intensity of the HD beam is increased too, so that this device is suitable for writing also a high-density information layer.

Such a scanning device may be further characterized in that the entrance face and the exit face of the beam shaper are constituted by a third and a fourth diffraction structure, respectively.

Such a beam shaper, which may be called a holographic beam shaper, may be designed in such a way that it changes the shape of the HD beam only and is invisible to the LD beam. As this beam shaper acts on the beam from only one of the elements of the two-wavelength laser, it needs to be aligned with this element only.

A scanning device, wherein a further integration has been implemented, is characterized in that the first and the third diffraction structures are merged in a first composite diffraction structure and the second and the fourth diffraction structure are merged in a second composite diffraction structure, which first and second composite diffraction structures are arranged at an entrance surface and an exit surface, respectively, of one transparent body.

An alternative scanning device, wherein a further integration has been implemented and wherein the beam shaper is a lens element having a cylindrical entrance surface and a toroidal exit surface, is characterized in that the first diffraction structure is arranged on the cylindrical entrance surface and the second diffraction structure is arranged on the toroidal exit surface.

With this beam shaper, both the HD beam and the LD beam are shaped. The two emitting elements of the two-wavelength laser should be correctly positioned with respect to the beam shaper. After a first of these elements has been positioned, the second element can be positioned by rotating the housing of the two-wavelength laser.

These and other aspects of the invention are apparent from and will be elucidated by way of example with reference to the embodiments described hereinafter and illustrated in the accompanying drawings.

In the drawings.

In these Figures, identical elements are denoted by the same reference numerals.

Figure 1:
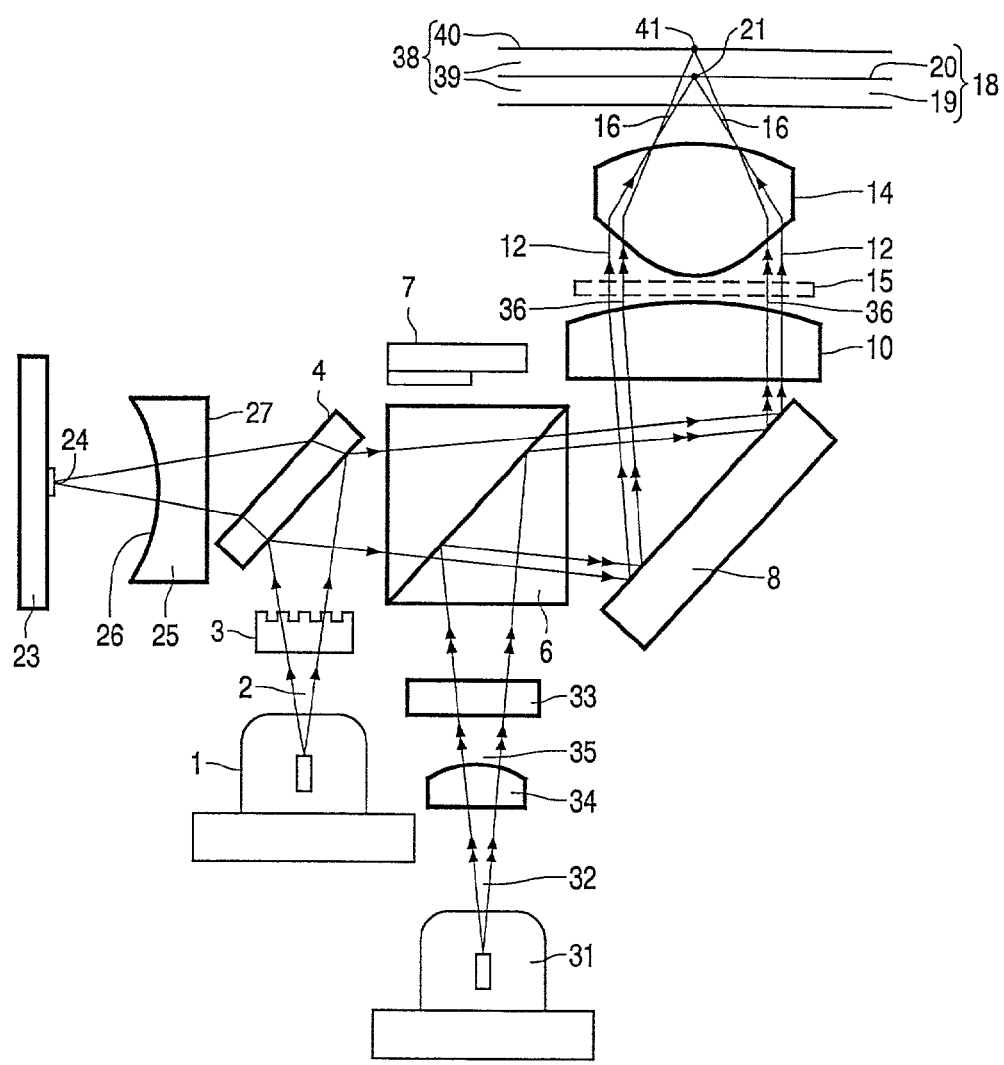
FIG. 1 shows a compatible scanning device comprising two diode lasers and a pre-collimator lens in the path of the LD beam.

FIG. 1 shows a scanning device, which has a first optical path for reading and possibly writing of a first type of record carrier at a short wavelength and a second optical path for reading and writing of a second type of record carrier at a long wavelength. The first type of record carrier may be a digital versatile disc (DVD) and the first wavelength, for example 650 nm, whereas the second type of record carrier may be a writable compact disc (CDW) and the first wavelength, for example 780 nm. The first optical path comprises a radiation source 1, e.g. a semiconductor, or diode laser, which emits a divergent radiation beam 2, the HD beam, of the first wavelength. A semi-transparent mirror 4 reflects a part of the beam 2 towards a dichroic beam splitter 6. When needed, a diffraction grating 3 may be arranged between the diode laser 1 and the mirror 4, which grating forms two diffracted beams and a non-diffracted beam. The diffracted beams are used for tracking purposes. The Figure shows only the non-diffracted beam for the sake of clarity. The three radiation beams, briefly called the radiation beam, are reflected by the semi-transparent mirror 3 towards the dichroic beam splitter 6 which has a high transmission for the first wavelength and passes beam 2 with a low attenuation. A reflector 8 reflects the beam 2 towards a collimator lens 10, which converts the divergent beam 2 into a collimated beam 12. This beam passes through an objective lens system 14, which changes collimated beam 12 to a converging beam 16 for scanning a record carrier 18. The objective lens system may consist of a single optical element, but it may comprise two or more optical elements, such as are shown in the Figure. The record carrier is of a first, high-density type and comprises a transparent layer 19 having a thickness of e.g. 0.6 mm, and an information layer 20, onto which converging beam 16 comes to a focus, or scanning spot, 21. The radiation reflected from information layer 20 returns along the optical path of beams 16 and 12 and is converged by the collimator lens 10. The reflected beam passes through the dichroic beam splitter 6 and the beam splitter 4 and is converged to a detector spot 24 on a detection system 23. This system converts the beam into an electric detector signal. An information signal representing information stored in information layer 20, and control signals for positioning focus 21 in a direction normal to the information layer 20 (focus control) and in a direction normal to the track direction (tracking control), can be derived from the detector signal.

The focus control signal can be generated by means of the so-called astigmatic method. As the beam splitter 4 is positioned at an acute angle relative to the chief ray of the reflected and converged beam, this beam splitter introduces astigmatism in this beam. The detection system comprises a quadrant detector by means of which the shape of the cross-section of the astigmatic beam in the plane of the detection system can be detected. This shape is determined by the position of the focus 21 relative to the information layer 20. A lens 25 may be arranged between the beam splitter 4 and the detection system. This lens may have a spherical concave surface 25 at the side of the detection system and may be used as a negative servolens to set the focus of the beam. This can be realized by shifting this lens along the optical axis. The surface 27 of lens 25 at the side of the beam splitter may be shaped cylindrically so that this lens has also a cylindrical lens function. This function can be used if the astigmatism introduced by the skew beam splitter 4 is too small. It is also possible that lens 25 is only a negative lens or only a cylindrical lens. If necessary, an element which corrects for the coma introduced by the beam splitter 4 may be arranged instead of, or in addition to such a lens.

The optical path for scanning the second type of record carrier comprises a radiation source 31, e.g. a semiconductor laser, which emits a divergent radiation beam 32, the LD beam, of a second wavelength, e.g. 780 nm. A grating 33 may be arranged in its optical path to form three beams in a way similar to grating 3. The dichroic beam splitter 6 reflects most, for example 90%, of the radiation of the LD beam and transmits the remaining radiation of this beam to an additional detector 7. This detector, which is called a feed-forward sensor, supplies an output signal that is proportional to the intensity of the beam from the diode laser 31 and can be used to control the intensity of this beam. The LD beam reflected by the beam splitter 6 follows the same path as the HD beam to arrive at the second type of record carrier 38. This record carrier comprises a transparent layer 39, having a thickness of e.g. 1.2 mm, and an information layer 40.

Record carriers 18 and 38 are drawn as single, two-layer record carriers having a semi-transparent information layer 20, but they may also be separate single-layer record carriers having transparent layers of different thicknesses.

The LD beam should be brought to a focus, or scanning spot, 41 on the information layer 40. The objective system 14 is designed so as to operate in the first mode at a first set of conjugates, wherein the HD beam from the source 1 is focused on information layer 20, and in the second mode at a second set of conjugates, wherein the LD beam from the source 31 is focused on information layer 40. Radiation reflected from information layer 40 returns along the path of the LD beam to the record carrier 38. A further beam splitter (not shown) may be arranged between the dichroic beam splitter 6 and the diffraction grating so as to reflect the reflected radiation towards a further detection system (not shown). This detection system for the LD beam has the same function as the detection system 23 for the HD beam. Preferably, the radiation of the reflected LD beam passing through the beam splitter 6, which is, for example 10% of the total radiation of this reflected beam, and is incident on the detection system 23 is used for reading and controlling of the position of the scanning spot 41 on the information layer 40. In this way, a second detection system is no longer needed and the scanning device is simplified. If necessary, the intensity of the LD beam incident on the detection system can be increased by adding some polarisation sensitivity to the beam splitter 6 and by arranging a quarter-wave plate 15 in the path of the LD beam between this beam splitter and the objective system, preferably between the collimator lens and the objective system. On its way to and from the record carrier 38, the LD beam passes this plate twice, so that its polarization direction is rotated through 90° relative to the polarization direction of the LD beam from the diode laser 31. Due to this polarization rotation, a larger part of the LD beam reflected by the record carrier 38 passes through the beam splitter 6, while the intensity of the LD beam incident on the information layer 40 is not decreased.

The objective system 14 is designed for the first mode to converge the collimated HD beam 12 of the first wavelength through a transparent layer 19 to focus 21 on information layer 20. The spherical aberration incurred by the converging beam 16 in passing transparent layer 19 is compensated in the objective system 14. The objective system complies with the sine condition. If transparent layer 19 is not present in an embodiment, the objective system should not be compensated for spherical aberration. In the second mode, the LD beam passes through transparent layer 39 having a thickness which differs from that of transparent layer 19. The objective system is not compensated for the spherical aberration incurred by the thickness of the transparent layer 39. However, it has been established that the spherical aberration is mainly caused by the outer annular area of the objective system, through which the border rays of the LD beam pass. In a small area around the focus 41, the wavefront of the converging LD beam, showing aberrations, is spherical in the central part of the objective aperture. The scanning spot 41 comprises a small central area with large intensity formed by rays emanating from the central part of the objective aperture and a larger annular area, around the central area, with smaller intensity formed by rays emanating from the outer area of the objective aperture. The quality of the central part of the scanning spot is sufficient for scanning the information layer 40 and a good scanning spot can be obtained by using only rays emanating from the central part of the objective aperture for forming this spot. A dichroic absorbing or deflecting ring could be arranged before or on the objective system, which ring absorbs or deflects radiation of the LD beam and passes radiation of the HD beam. The objective system then transmits the whole HD beam but only the central part of the LD beam. In this way, a considerable part of the intensity of the LD beam is lost and the remaining intensity of the scanning spot 41 is too small for recording information by means of this spot.

A better alternative, especially for a compatible scanning device which should be able to record information in the second information layer 40, is to arrange a positive lens 34 in the path of the LD beam only, as shown in FIG. 1. This lens converts the divergent beam 32 from the source 31 into a less divergent beam 35 and may be called a pre-collimator lens. The LD beam 35 is converted by the collimator lens 10 into LD beam 36, which fills only the central part of the aperture of the objective system.

Figure 2:
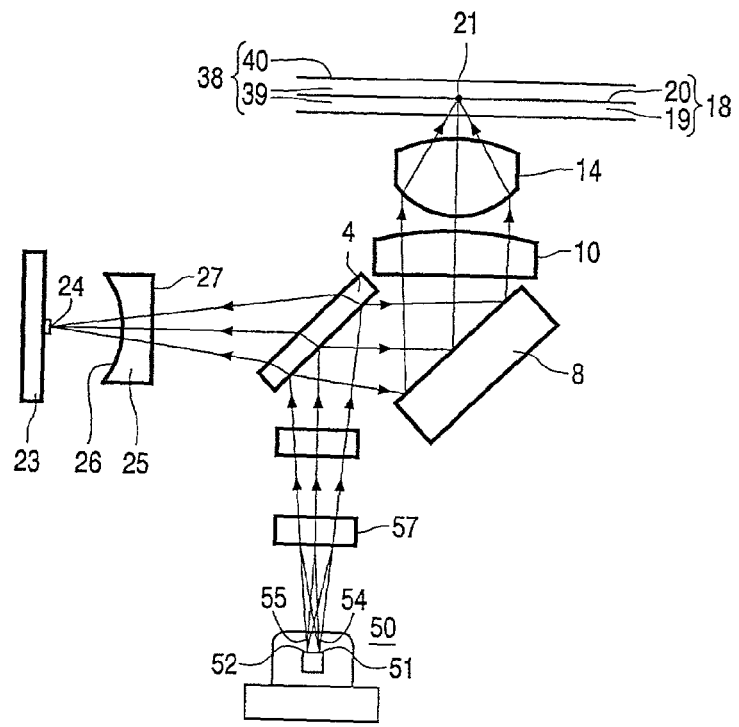
FIG. 2 shows a compatible scanning device with a two-wavelength diode laser and a diffraction element for combining the HD and LD beams.

The scanning device of FIG. 1 with the two separated diode lasers 1 and 31 and the dichroic beam splitter 6 is relatively complex and large. A simpler and more compact system can be obtained if a two-wavelength diode laser 51 is used, as shown in FIG. 2. A two-wavelength diode laser is a composite semiconductor device, which has two elements 51,52 emitting radiation beams 54,55 at two different wavelengths. Although the distance between the emitting elements is as small as possible, the chief rays of the radiation beams do not coincide. In order to make the two beams co-axial, a specific diffraction element 57 is arranged in the path of the beams. This element has a phase structure of alternating grooves and lands. The depth of the grooves is chosen to be such that the element acts as a grating for one of the beams, for example the LD beam 32, whereas it is a transparent element for the other beam. The grating structure is designed to diffract the LD beam in such a way that its chief ray comes to coincidence with the chief ray of the HD beam. A scanning device with the two-wavelength laser 50 and the specific diffraction element 52 is disclosed in the English-language abstract of JP-A 11-185282.

In the device of FIG. 2, no separate detection systems for the HD beam and the LD beam are needed. The reflected HD beam and the reflected LD beam are incident on the same detection system 23. These beams form detector spots 24 and 24', respectively, on the detection system. The device of FIG. 2 is suitable for reading both a high-density record carrier and a low-density record carrier. However, as the two emitting elements 51,52 are very close together in this device, it is not possible to arrange a positive, or pre-collimator, lens in the path of the LD beam only, so that this device is less suitable for also writing information in information layer 40.

According to the invention, this problem can be solved by arranging a second diffraction element in the radiation path of the beams from the two-wavelength laser device 50. This second diffraction element has also a phase structure of alternating grooves and lands and the depth of the grooves is chosen to be such that the element acts as a diffraction element for the LD beam only, whereas the element is only a transparent element for the HD beam.

The second diffraction element may be a separate element comprising a transparent substrate, one side of which is provided with the diffraction structure. Preferably, the first and second diffraction elements are integrated in one, composite, diffraction element comprising one transparent substrate of a certain thickness, one side of which is provided with a first diffraction structure and the opposite side is provided with a second diffraction structure. The number of elements in the device and the costs of manufacturing this device are then reduced. The composite diffraction element can be manufactured relatively easily by means of moulding or replication techniques in one step if use is made of two moulds, which have an inner surface structure corresponding to the first and the second diffraction structure, respectively.

Figure 3:
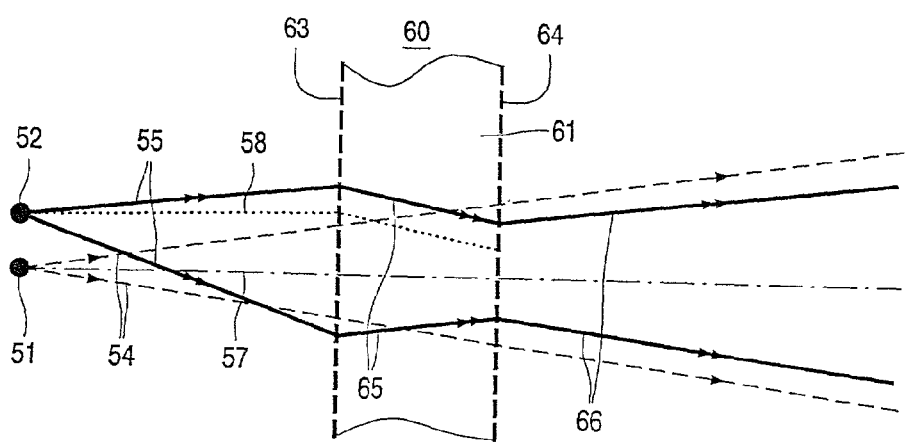
FIGS. 3, 4 and 5 show a first, second and third embodiment, respectively, of a composite diffraction element and its influence on the LD and HD beams.

FIG. 3 shows a first embodiment of the composite diffraction element 60 and the paths of the HD beam 54 and the LD beam 55 from the emitting elements 51 and 52, respectively of the two-wavelength laser to the beam splitter 4 of FIG. 2 and passing through the diffraction element 60. The optical axis of the radiation path portion shown in FIG. 3 coincides with the chief ray 57 of the HD beam 54. The composite diffraction element comprises a substrate 61 that is transparent to the two wavelengths of beam 51 and beam 52. At the side of the emitting elements 51,52, the substrate is provided with a diffraction structure 63, for example a Fresnel lens structure with substantially circular grooves and lands, which acts as a positive lens for the LD beam 55. This diffraction structure converts the diverging beam 55 into a converging beam 65. After having passed the substrate 61, the cross-section of LD beam 65 is smaller than that of HD beam 54. At the side remote from the emitting elements 51,52, the substrate 61 is provided with a second diffraction structure 64, which converts the converging beam 65 into a diverging beam 66, the border rays of which are substantially parallel to the corresponding border rays of the HD beam 54. The diffraction structure 64 acts as a negative lens for the LD beam and may also be a Fresnel lens type structure. The depths of the grooves of both diffraction structures 63 and 64 are chosen to be such that these structures have no influence on the HD beam 54, i.e. they do not change the direction or the vergence of this beam.

The diffraction structures 63 and 64 may be formed as holograms. Preferably, the original structures for these holograms, i.e. the structures used for forming the moulds by means of which the diffraction element 60 is manufactured, are computer-generated structures.

In the embodiment of FIG. 3, the numerical aperture of the collimating structure is small. This is advantageous in view of incident angle dependency of coatings and tolerance requirements. In this embodiment, the radiation which forms the beam 66 originates from an asymmetrical portion 55 of the source beam. This is indicated by the dotted line 58, which represents the maximum intensity within the beam 55. Due to the asymmetry in the beam 55, also the beam 66 may show some asymmetry in intensity, which is acceptable for this beam for reading and writing a low-density information layer.

Figure 4:
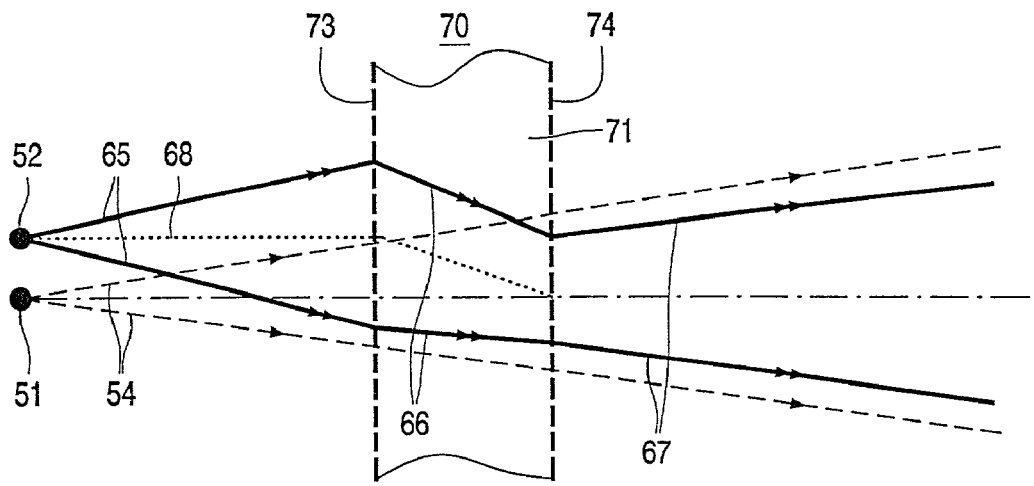

However, as shown in FIG. 4, such asymmetry in intensity can be avoided. In the embodiment of this Figure, the radiation of the beam 66 leaving the composite diffraction element originates from a beam 65, which is a symmetrical portion of the beam from the emitting element 52. The line 68 of maximum intensity is parallel to the optical axis 57. The embodiment of FIG. 4 requires asymmetric diffraction structures 73 and 74, i.e. structures, which do not only change the vergence of the LD beam, but also deflect a portion of the beam with respect to the optical axis.

Figure 5:
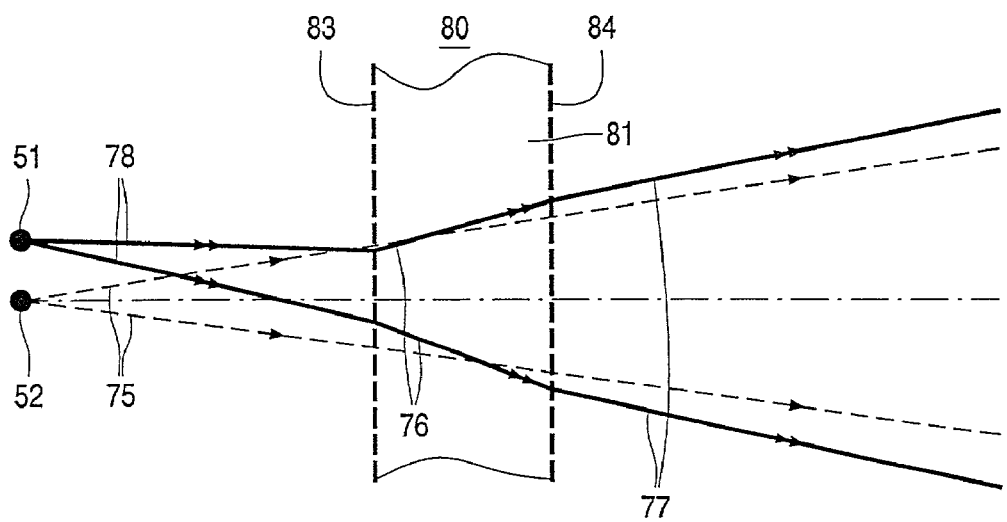

FIG. 5 shows an alternative embodiment wherein the diffraction element 80 introduces changes in the HD beam, instead of in the LD beam. The first diffraction structure 83 forms a negative lens for the HD beam 78 and converts this divergent beam into a more divergent beam 76. At the side of the second diffraction structure 84, the cross-section of the HD beam 76 is larger than that of the LD beam 75. The second diffraction structure converts the HD beam 76 into a less divergent beam 77, which border rays are substantially parallel to the corresponding border rays of the LD beam 75. For the LD beam, which should have a large intensity for writing, the embodiment of FIG. 5 has the advantage that this beam does not suffer from diffraction losses, which may occur if diffraction structures are used. Such diffraction losses can only decrease the intensity of the HD beam, which is used for reading.

In the embodiment of FIG. 5, a simple diffraction structure 83, which has only a lens function and selects an asymmetrical portion 78 of the beam from the source 51 for forming the beam 77, may be used in the same way as in the embodiment of FIG. 3 if some asymmetry in the intensity distribution of this beam is acceptable. If the beam 77 should have a symmetrical intensity distribution, a more complicated diffraction structure 83, which selects a symmetrical portion 78 of the source beam, should be used in the same way as in the embodiment of FIG. 4.

The pitch, or grating period, at a given position on the hologram is determined by the angle of incidence of the radiation at that location, which means that the pitch varies. By means of Snell's law of refraction, grating equations and geometrical requirements for the scanning device, the following equations can be derived for the grating pitches P of the holograms of FIG. 4, as a function of the sine ($\rho$) of the angle of incidence on the first hologram:

$$P_1(\rho) = \frac{t \cdot \lambda}{s \cdot n \cdot + (g \cdot n + d) \cdot \rho \cdot (1 - NAo/Nai)}$$

$$P_2(\rho) = \frac{-t \cdot \lambda}{s \cdot n + g \cdot n \cdot \rho \cdot (1 - Nao/Nai)}$$

In these equations:
t is the thickness of the substrate 71;
$\lambda$ is the wavelength of the LD beam;
n is the refractive index of the substrate 71;
s is the distance between the laser elements 51 and 52;
g is the distance between the laser and the first hologram 73
Nao is the required numerical aperture of the LD beam incident on the collimator lens 10, and
Nai is the numerical aperture of the sub-beam portion of the LD beam from laser element 52, which sub-beam portion should be converted into a beam with Nao.

By computing the values of P1($\rho$) and P2($\rho$) for a number of different values for the parameters g and t, it was established that for both holograms:
the pitch increases if the distance g increases;
the pitch increases if the substrate thickness t increases, and
the pitch is zero for a given value of $\rho$, which given value is different for the two holograms.

For a hologram of the kind discussed here to be manufacturable without problems, the pitch should not be too small. This means that the distance g should be as small as possible and the thickness t as large as possible, while the other design parameters of the scanning device should be taken into consideration. For the scanning device discussed here, suitable values for g and t are:

$1 \text{ mm} \leq g \leq 4 \text{ mm}$ $2 \text{ mm} \leq t \leq 8 \text{ mm}$.

For a practical embodiment of the scanning device, a distance g=2 mm and a thickness t=3 mm are preferred values. For these values and for n=1.5 and s=0.1 mm, the pitch values P(+Nai) and P(−Nai) at the positions where the border rays are incident and the pitch values P(0) at the position where the chief ray of the LD beam, captured by the first hologram, are incident are given below.

$$P_1(+Nai)=4.618 \ \mu m \ P_2(+Nai)=-7.136 \ \mu m$$

$$P_1(0)=15.7 \ \mu m \ P_2(0)=-15.7 \ \mu m$$

$$P_1(-Nai)=-11.241 \ \mu m \ P_2(-Nai)=78.5 \ \mu m$$

Figure 6:
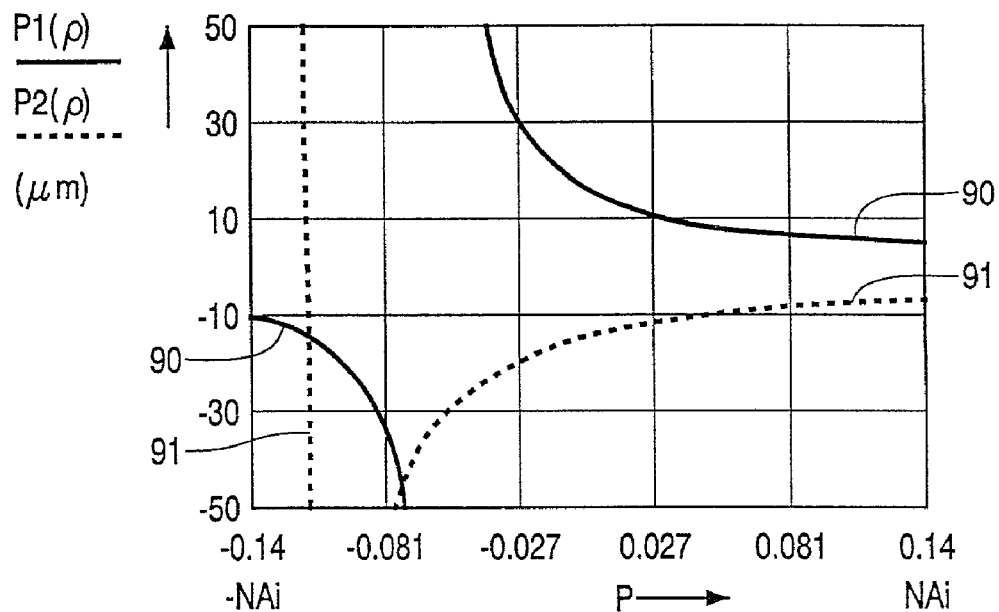
FIG. 6 shows the pitches as a function of the position on the two diffraction structures of an embodiment of a composite diffraction element.
Figure 7:
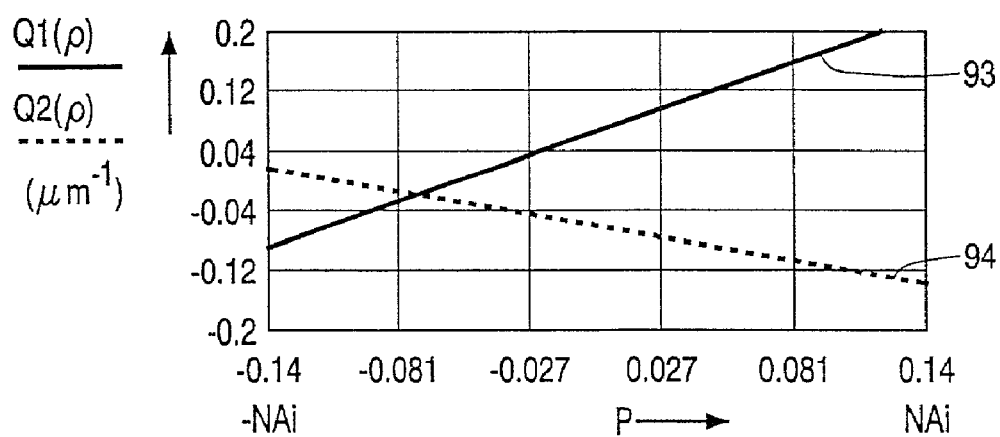
FIG. 7 shows the frequencies of these diffraction structures.

The pitches for other values of ρ, thus for other angles of incidence on other positions of the holograms can be taken from FIG. 6. The variation of $P_1$ and $P_2$ as a function of ρ is represented by curves 90 and 91, respectively, of this Figure. The corresponding variations of the grating frequency, thus the number of grating grooves per length unit (μm) $Q_1=1/P_1$ and $Q_2=1/P_2$ are shown in FIG. 7 by curves 93 and 94, respectively.

Figure 8:
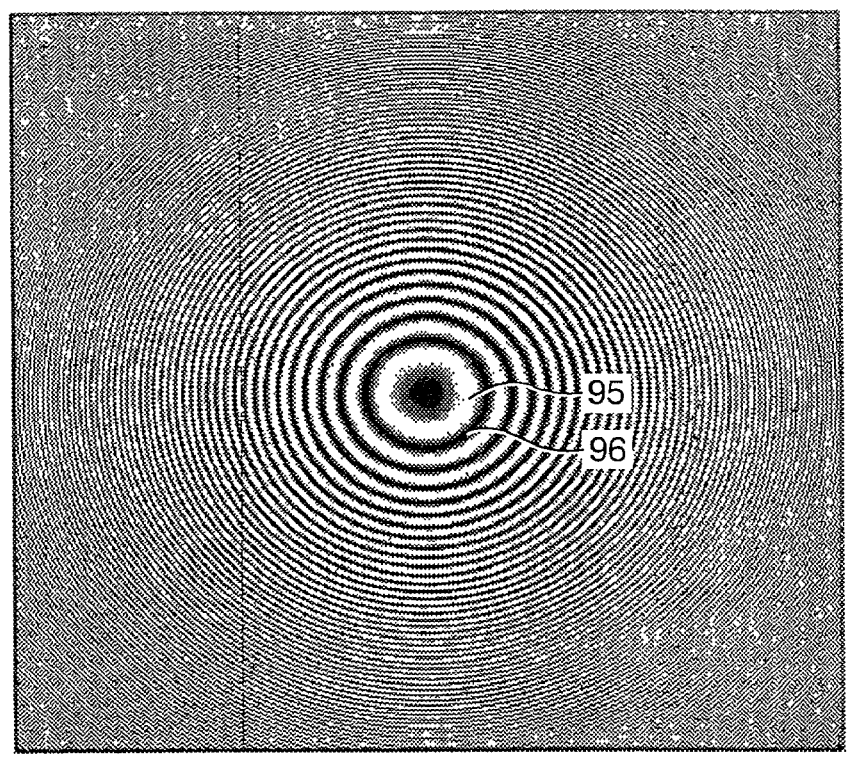
FIGS. 8 and 9 are plane views of an embodiment of the first and second diffraction structures, of a composite diffraction element.
Figure 9:
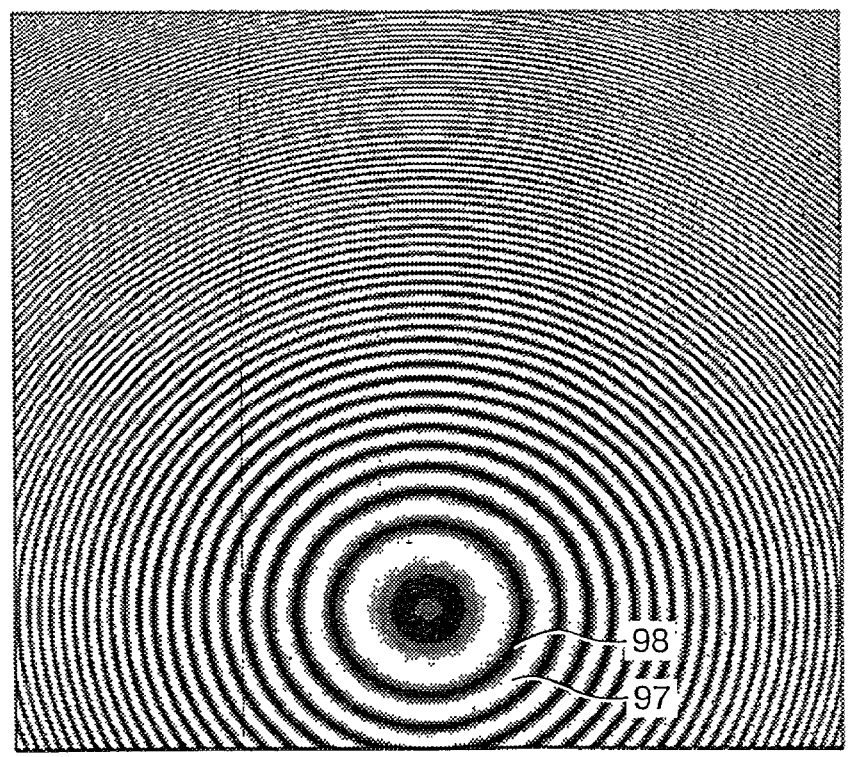

The first hologram 73 and the second hologram 74, which have the above parameter values, are shown in FIG. 8 and FIG. 9, respectively. The grating grooves of the holograms 73 and 74 are indicated by 95 and 97, respectively, and the lands between these grooves are indicated by 96 and 98, respectively. These Figures clearly show the variation of the grating pitch.

Calculations of the temperature behaviour show that a smaller distance g and a larger thickness t are favoured in view of the defocusing as a function of the temperature. As already remarked, the depth d of the grooves of the holograms should be such that these grooves introduce a phase shift of N.2π rad in one of the beams, in FIG. 4 the HD beam, and a phase shift of (2N+1)π rad in the other, LD, beam. The holograms have a maximum effect on the latter beam, while they are invisible to the former beam. The phase shift Δφ introduced by a hologram grating in a beam with wavelength λ is given by:

$$\Delta\phi=2\pi.d \ . \ .(n-1)/\lambda.$$

Figure 10:
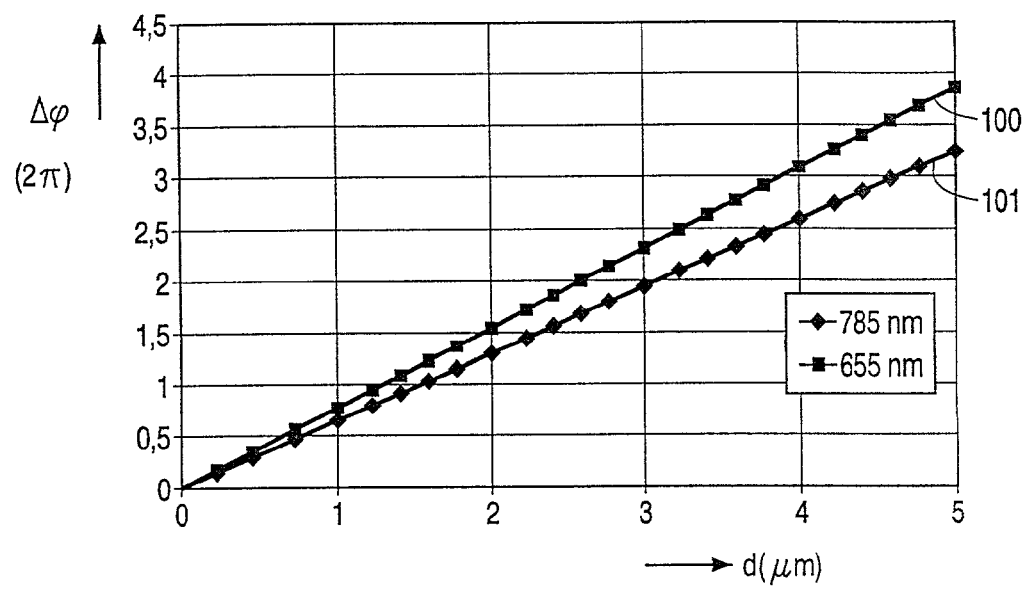
FIG. 10 shows the phase shift introduced in the HD beam and the LD beam as a function of the depth of the grooves of a diffraction structure.

FIG. 10 shows the phase shift as a function of the groove depth d for the HD beam, with λ=655 nm, (curve 100) and for the LD beam with λ=785 nm (curve 101). The unit for the phase shift Δφ is 2π. It can be derived from FIG. 10 that d=3.9 μm is the first depth for which the phase shift for the HD beam is an even number of π rad and an odd number of grad for the LD beam. The phase shift for the LD beam is also an odd number of π, namely 3π, rad for d=2.3 μm. The phase shift for the HD beam is then not exactly an even number of π rad, but under circumstances this value of d may be usable. It is easier to manufacture a holographic grating with a groove depth of 2.3 μm than a grating with a groove depth of 3.9 μm. In the embodiment of FIG. 5, the phase shift for the HD beam should be an odd number of π rad and the phase shift for the LD beam should be an even number of π rad. The first groove depth for which this is the case, is d=4.7 μm. For d=3.3 μm, the phase shift for the HD beam is also an odd number of π rad and the phase shift for the LD beam is close to an even number of π rad, so that this depth may also be usable.

Preferably, the holographic gratings are blazed for the first diffraction order. This means that the walls of the grooves are slanted so that a maximum amount of the radiation is diffracted in one of the first orders and a minimum amount in the other orders. The blaze angle θ for the first diffraction order is given by:

$$\text{Sin}(\theta_{blaze}) = \frac{\lambda}{P \cdot (n-1)}$$

As the pitch P varies over the holograms, also the pitches vary over the holograms. In the embodiment of FIG. 4, the blaze angle in the first hologram varies from +19.9° via 0° to −8,1°.

Figure 11:
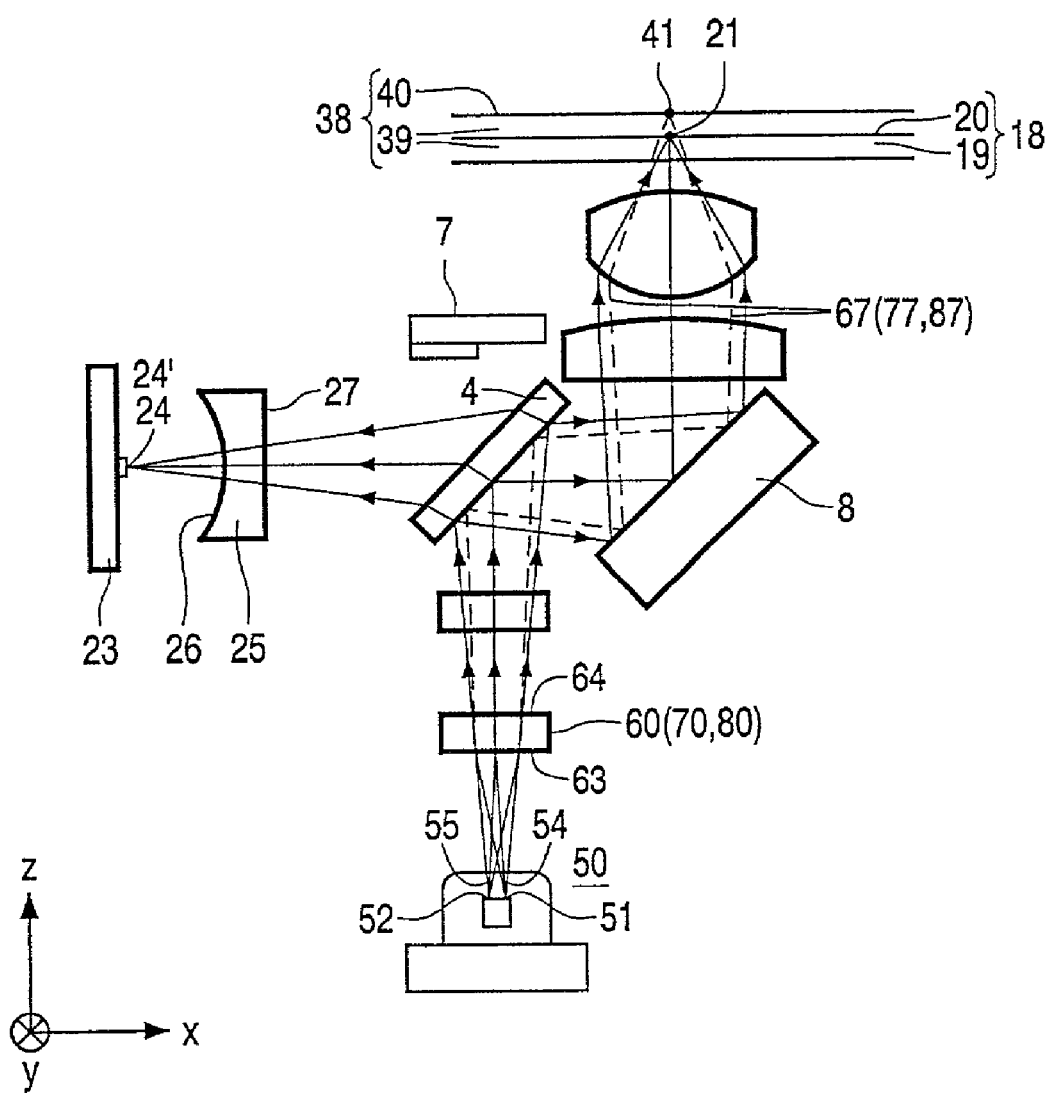
FIG. 11 shows an embodiment of the scanning device according to the invention.

FIG. 11 shows a compatible scanning device wherein the invention has been implemented. This device differs from that of FIG. 2 in that the single diffraction element 57 has been replaced by a composite diffraction element, 60 or 70 or 80, as described hereinbefore, so that effectively a lens is introduced in the path of the LD beam only or in the path of the HD beam only. By means of this lens, it is ensured that the LD beam, 66 or 67 or 75, has a smaller cross-section than the HD beam at the aperture of the objective system 14, while the LD beam has sufficient energy to write information in information layer 40. Preferably, the diffraction element is arranged at a position where the cross-sections of the beams are still small, thus close to the two-wavelength diode laser. In this device, one detection system 23 is used for both the reflected HD beam and the reflected LD beam, which beams form detector spots 24 and 24', respectively. These spots should coincide exactly on the detection system. This can be achieved by adjusting the composite diffraction element, 60 or 70 or 80, in the X, Y or Z direction.

Figure 12:
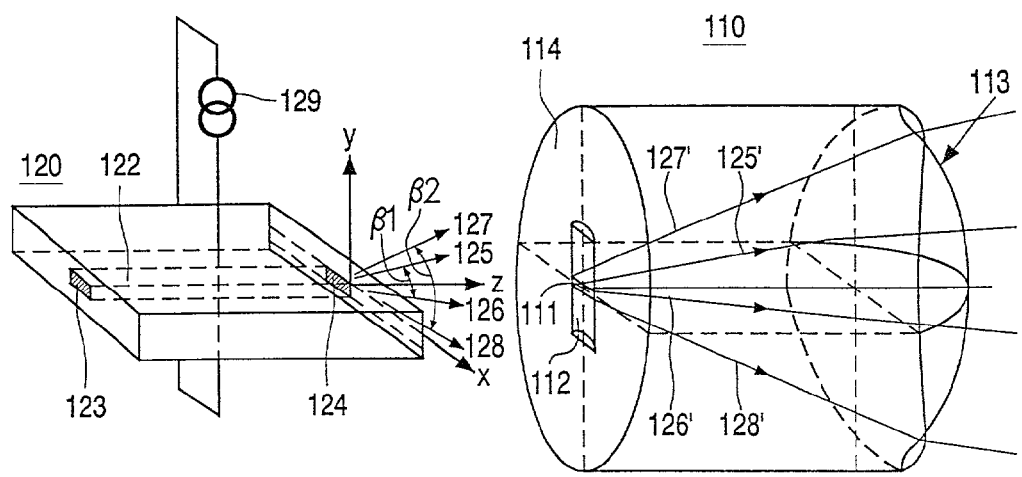
FIG. 12 shows an embodiment of a beam shaper for use in the scanning device, which shaper may be integrated with the composite diffraction element.

In a scanning device wherein a diode laser is used as a radiation source, a so-called beam shaper can be arranged close to the diode laser to increase the rim intensity of the scanning beam. A diode laser emits a beam whose angular aperture in a plane parallel to its active layer, known as the lateral plane, is smaller than the angular aperture in a plane perpendicular to the active layer, known as the transversal plane. At some distance from the diode laser, in the so-called far field of the diode laser, the beam of such a diode laser has an elliptical cross-section. In a scanning device for scanning an information layer, a round and small, preferably diffraction-limited, scanning spot should be used. To this end, the objective system by means of which the scanning spot is formed must be filled with a radiation beam having a circular cross-section. If the objective system is illuminated by a diode laser beam which has an elliptical cross-section the dimensions at the entrance aperture of the objective system should be such that the aperture is filled in the direction of the small axis of the ellipse, while in the direction of the long axis of the ellipse an amount of radiation will fall outside the aperture. Such a loss of radiation can be avoided by arranging a beam shaper, which converts the elliptical beam into a round beam, between the diode laser and the objective system. An attractive beam shaper is disclosed in U.S. Pat. No. 5,467,335. FIG. 12 shows this beam shaper 110, which is a lens element having a cylindrical entrance surface 112 and a toroidal exit surface 113 and can be arranged close to the diode laser 120. This laser comprises a plurality of differently doped layers of which only the strip-shaped active layer 122 is shown. This strip is bounded by two partially transparent mirror facets 123 and 124 so that laser radiation, which is generated when an electric current from a current source 129 is passed through the laser, can leave the active strip 2. The cross-section, in the XY plane of the three-axis system of co-ordinates XYZ, of the active strip 122 and of the front facet 4 is rectangular. Due to this shape, the beam emitted by the diode laser is not symmetrical but has an aperture angle $\beta_1$ in the XZ plane parallel to the active strip 122, i.e. the lateral plane, which aperture angle is smaller than the aperture angle $\beta_2$ in the YZ plane, i.e. the transversal plane. The border rays of the laser beam in the lateral plane are denoted by the reference numerals 125 and 126 and those in the transversal plane are denoted by the reference numerals 127 and 128. The entrance surface 112 has the shape of a part of a cylinder whose cylindrical axis is parallel to the Y-axis. For the rays in the YZ plane, the entrance surface is a flat interface between, for example air and the lens medium having a refractive index of, for example n, so that these rays are deflected towards the Z-axis to an extent which is determined by n. In other words, an angular magnification of 1/n, which is a reduction, occurs in the YZ plane at the entrance surface 112. In the XZ plane, the entrance surface 112 has a curvature R and this surface introduces an angular magnification of n. The exit surface 113 of the beam shaper 110 has such a radius of curvature R1 in the transversal plane and is arranged at such a Z position that its centre of curvature substantially coincides with the image, formed by the surface 112, of the laser facet 124. The surface 113 transmits the rays in the transversal plane in an unrefracted form and the angular magnification in this plane is substantially equal to one. In the lateral plane, the exit surface has such a radius of curvature $R_2$ that its centre of curvature coincides with the virtual image, formed by the surface 112, of the centre of the laser facet 124 so that the angular magnification in this plane is approximately one. Since the two virtual images formed by the entrance surface 112 are located at different positions along the Z-axis, the exit surface 113 should have a slightly toroidal shape so as to combine these images to one image. Toroidal is understood to mean that the radius of curvature of the surface in the lateral plane differs from that in the transversal plane. This is shown in FIG. 12 by means of the non-coplanar peripheral curve of the exit surface. For further details and embodiments of the beam shaper of FIG. 12, reference is made to U.S. Pat. No. 5,467,335.

The scanning device of the present invention, comprising a two-wavelength laser diode, may be provided with a beam shaper. If a beam shaper like that described in U.S. Pat. No. 5,467,335 is used, both the HD beam and the LD beam are shaped. If the HD beam should have sufficient intensity to write information, a diffraction beam shaper is preferably used which shapes the HD beam only. The diffraction beam shaper is provided with a diffraction structure at its entrance and exit surfaces. These diffraction structures perform the lens functions of the lens beam shaper. The beam-shaping diffraction element may be integrated with a composite diffraction element, for example element 60, described hereinbefore. The composite diffraction structure at the entrance surface of such an integrated diffraction element is a superposition of the diffraction structure 63 and a diffraction structure needed for beam shaping, and the composite diffraction structure at the exit surface is a superposition of the diffraction structure 64 and a diffraction structure needed for beam shaping. Such an integration with beam-shaping diffraction structures is also possible for the other composite diffraction elements 70 and 80 described hereinbefore. It is also possible that the two diffraction structures of the diffraction element 60, 70 or 80 are integrated with the entrance surface 112 and the exit surface 113, respectively, of the lens beam shaper shown in FIG. 12. Each of these surfaces is then provided with a holographic diffraction structure, for example modifications of the structures shown in FIGS. 8 and 9. The two emitting elements of the two-wavelength diode laser should be correctly positioned with respect to the integrated lens beam shaper. After a first one of these elements has been positioned, the second element can be positioned by rotating the housing of the two-wavelength laser. The diffraction elements 60 or 70 or 80 or modifications thereof may also be integrated with a beam shaper of a different type than that shown in FIG. 12.

The invention claimed is:

1. An optical scanning device for scanning, in a first mode of operation, a first type of record carrier having a first information layer and a first transparent layer of a first thickness and for scanning, in a second mode of operation, a second type of record carrier having a second information layer and a second transparent layer of a second thickness different from the first thickness, which device comprises a two-wavelength diode laser for generating a first, HD (high density scanning), radiation beam in the first mode and a second, LD (low density scanning), radiation beam in the second mode, an objective system designed for operation at a first set of conjugates to focus the HD beam on the first information layer in the first mode and for operation at a second, different, set of conjugates to focus the LD beam on the second information layer in the second mode, and a first diffraction element arranged in the radiation path between the two-wavelength diode laser and the objective system, characterized in that a second diffraction element is arranged in the radiation path between the two-wavelength diode laser and the objective system, which element has a lens function for either the LD beam or the HD beam only.

2. An optical scanning device as claimed in claim 1, characterized in that the first and second diffraction elements are constituted by a first and a second diffraction structure arranged at an entrance surface and an exit surface, respectively, of a transparent body.

3. An optical scanning device as claimed in claim 1, characterized in that at least one of the first and second diffraction elements has a positive lens function.

4. An optical scanning device as claimed in claim 1, characterized in that least one of the first and second diffraction element has a negative lens function.

5. An optical scanning device as claimed in claim 1, characterized in that the second diffraction element is designed so as to select, for the beam whose vergence is adapted, a symmetrical portion of the corresponding beam from the two-wavelength laser.

6. An optical scanning device as claimed in claim 5, characterized in that the first and second diffraction elements are arranged close to the two-wavelength diode laser.

7. An optical scanning device as claimed in claim 6, characterized in that the distance between the diode laser and the diffraction element facing the laser is between 1 mm and 4 mm.

8. An optical scanning device as claimed in claim 7, characterized in that the distance between the first and second diffraction elements is between 2 mm and 8 mm.

9. An optical scanning device as claimed in claim 8, characterized in that a beam shaper is arranged in front of the two-wavelength diode laser, which beam shaper has a beam vergence changing entrance face and a refractive exit face.

10. An optical scanning device as claimed in claim 9, characterized in that the entrance face and the exit face of the beam shaper are constituted by a third and a fourth diffraction structure, respectively.

11. An optical scanning device as claimed in claim 10, characterized in that the first and the third diffraction structure are merged in a first composite diffraction structure and the second and the fourth diffraction structure are merged in a second composite diffraction structure, which first and second composite diffraction structures are arranged at an entrance surface and an exit surface, respectively of one transparent body.

12. An optical scanning device as claimed in claim 9, wherein the beam shaper is a lens element having a cylindrical entrance surface and a toroidal exit surface, characterized in that the first diffraction structure is arranged on the cylindrical entrance surface and the second diffraction structure is arranged on the toroidal exit surface.

* * * * *